Patented Sept. 27, 1949

2,483,209

UNITED STATES PATENT OFFICE 2,483,209

METHOD FOR HYDROLYZING CHLOROSILANES AND PREPARING POLYSILOXANE RESINS

Harry F. Lamoreaux, Ballston Lake, N. Y., assignor to General Electric Company, a corporation of New York No Drawing. Application November 21, 1945, Serial No. 630,135

7 Claims. (Cl. 260—46.5)

The present invention relates to novel polysiloxane resins and to a method of preparing such polysiloxanes. It is particularly concerned with an improved process of hydrolyzing mixtures of chlorosilanes having a hydrocarbon-to-silicon ratio greater than 1 and not more than 1.5 and including a major portion of methylchlorosilanes.

It is well known that organohalogenosilanes, or mixtures thereof which may also contain some silicon tetrahalides, readily hydrolyze when mixed with water to form silanols which condense or can be caused to condense to form polysiloxanes. The ease with which the silanols condense is dependent on the nature of the organic radical or radicals. When all or substantially all of these radicals are methyl groups the rate of dehydration or condensation is so rapid that for all practical purposes the condensation of the silanols occurs simultaneously with the hydrolysis of the chlorosilanes. Because both reactions occur instantaneously, the hydrolysis of methylchlorosilanes containing a sufficient number of chlorine atoms attached to silicon to form heat-hardenable products by mixing them with water results in the formation of insoluble gels which cannot be used in the manufacture of useful resinous compositions or in the formation of products of low average molecular weight rather than the high average molecular weight products sought in the preparation of resinous products in general.

Various methods have been devised for controlling the hydrolysis reaction and the earlier attempts along this line had for their principal object the prevention of gel formation during hydrolysis. However, as more and more knowledge accumulated concerning the various methods of hydrolysis, it became apparent that certain methods not only permitted the carrying out of the hydrolysis without using ice or ice-water mixtures for the more readily hydrolyzable chlorosilanes but also resulted in the formation of polysiloxanes having properties markedly different than those of the earlier known polysiloxanes which had the same general formula and were prepared from the same chlorosilane mixtures. It thus appears that the polysiloxanes, particularly those obtained by the cohydrolysis and cocondensation of mixtures of two or more chlorosilanes, will differ from one another, depending on the conditions of hydrolysis and condensation, in much the same way that other resinous materials, such as the phenol formaldehyde condensation products, differ from one another depending upon the conditions under which the resin forming reactions are caused to take place.

One of the earlier methods for controlling the hydrolysis of methylchlorosilanes is described in Rochow Patent 2,258,218 and comprises dissolving the chlorosilane mixture in ether and adding the resultant solution to ice or a mixture of ice and water. Another process is described and claimed in the copending application S. N. 455,617 filed August 21, 1942 (now U. S. Patent 2,398,672, issued April 16, 1946) in the name of Robert O. Sauer and assigned to the same assignee as the present invention. The Sauer process comprises the solution of the chlorosilanes in a solvent such as toluene and the addition to this solutoin to a mixture comprising water and a higher alcohol such as butanol. Although the prior methods resulted in the formation of liquid, heat-hardenable products, they also involve certain disadvantages. Large volumes of solvents were usually necessary and in some cases the resinous products possessed poor craze resistance. Certain of the methods did not lend themselves either to the easy separation of the solvents or the recovery of the hydrogen chloride byproduct, both of which are essential in any large scale commercial project.

The present invention is based on the discovery that improved polysiloxane resins can be obtained by partially hydrolyzing a mixture of hydrocarbon-substituted chlorosilanes including a major portion of methylchlorosilanes, heating the partially hydrolyzed products in order to remove most of the hydrogen chloride dissolved therein and thereafter completing the conversion of the chlorosilanes to polysiloxanes by adding enough water or ammonium hydroxide to complete their hydrolysis.

It has been found that diethylene oxide and the diethers of ethylene and diethyl glycol serve as excellent solvents or mediums for the hydrolysis of the chlorosilanes, particularly methyl and phenyl chlorosilanes, or mixtures of the two. This type of solvent includes dioxane, diethyl Cellosolve (bis(beta-ethoxyethyl)ether) and diethyl Carbitol (ethylene glycol diethyl ether).

The invention is particularly concerned with the formation of methyl and methyl phenyl polysiloxanes from mixtures of methylchlorosilanes including a major portion of methyltrichlorosilanes or mixtures of methyl and phenyl chlorosilanes containing a major portion of methyltrichlorosilane, phenyltrichlorosilane, or the mixtures of the two. Ordinarily, the water employed for the partial hydrolysis of the chlorosilanes will be in an amount ranging from about 50 to about 80 per cent of that calculated as necessary for complete hydrolysis of the chlorosilanes. Stated alternatively, on a molar basis, since it is evident that for complete hydrolysis of a chlorosilane, at least 0.5 mol water may be employed in effecting complete hydrolysis of each gram atom of chlorine, to effect from 50 to 80 per cent hydrolysis of a chlorosilane or a chlorosilane mixture, from 0.25 to 0.40 mol of water is used in certain embodiments of my invention for each gram atom of hydrolyzable chlorine.

For any given chlorosilane mixture the resinous products obtained by the present method of hydrolysis have been found to form harder and tougher cured films than the previously known resins, such as those prepared by the above-mentioned Sauer process.

In order that those skilled in the art better may understand how the present invention can be carried into effect, the following examples are given:

Example 1

A solution of 100 g. methyltrichlorosilane and 80 g. dimethyldichlorosilane in 200 g. dioxane and 50 g. mineral spirits was placed in a flask provided with a reflux condenser, stirrer and dropping funnel. 20 cc. of water was added dropwise to this solution. The reaction mass was agitated fairly well during the hydrolysis. At completion of the partial hydrolysis, the reaction mass was refluxed to remove the bulk of the absorbed hydrogen chloride, 2 hours usually being a sufficient reflux time. When the mass had cooled to about 80 degrees C., 10 cc. of water was added rather rapidly and the reaction mass again heated to refluxing. By having the hydrolysing equipment so constructed to include a small trap and draw-off tube just below the tip of the reflux condenser, the dioxane was then drawn-off until the temperature of the remaining resin solution reached 140 degrees C. The resin solution was removed from the hydrolyzer and filtered.

At this point the resin solutions may retain small quantities of hydrogen chloride which, if desired, can be removed by adding an alkaline material such as calcium oxide, sodium carbonate, etc., and refiltering or by adding the neutralizer directly to the hydrolyzed mass before the initial filtering.

The cured films of the resinous product of Example 1 were harder and tougher than films of previously known polysiloxane resins prepared from the same chlorosilane mixture.

Example 2

Employing the same equipment as that described in Example 1, a mixture of 100 g. methyltrichlorosilane, 60 g. dimethyldichlorosilane and 20 g. diphenyldichlorosilane dissolved in 200 g. of diethyl Carbitol were partially hydrolyzed by the dropwise addition of 20 cc. water. The partially hydrolyzed chlorosilanes were then heated to the refluxing temperature of the solution to remove the bulk of the hydrogen chloride. The addition of 10 cc. of water completed the hydrolysis of the chlorosilanes after which the solvent was removed under vacuum and the remaining resin dissolved in toluene to form a polysiloxane varnish having properties similar to the product of Example 1.

Example 3

Employing the same equipment as that used in Example 1, a mixture of 41 g. methyltrichlorosilane, 100 g. dimethyldichlorosilane and 39 g. silicon tetrachloride dissolved in 200 g. diethyl Cellosolve was partially hydrolyzed by the addition of 20 cc. of water. The hydrogen chloride dissolved in the partially hydrolyzed product was removed by fractionation, after which 10 cc. of water was added to complete the hydrolysis of the chlorosilanes. The resinous product was relatively fast curing and the cured products were hard, tough, and non-brittle.

What I claim as new and desire to secure by Letters Patent of the United States, is:

1. The method of preparing a polysiloxane resin which comprises partially hydrolyzing a mixture of monovalent hydrocarbon-substituted chlorosilanes including methylchlorosilanes having a hydrocarbon-to-silicon ratio of at least one and not more than 1.5 by adding to a solution of said chlorosilane mixture in a polyether solvent a quantity of water less than that calculated as necessary for complete hydrolysis of the chlorosilanes, heating the resultant product to remove a major portion of the hydrogen chloride dissolved therein and thereafter adding sufficient water thereto to complete the conversion of the chlorosilanes to polysiloxanes.

2. The method of preparing a polysiloxane resin which comprises forming a solution of a mixture of monovalent hydrocarbon-substituted chlorosilanes containing a major portion of methylchlorosilanes and having a hydrocarbon-to-silicon ratio of at least one and not more than 1.5 in a polyether solvent, adding to said solution a quantity of water less than that theoretically necessary for complete hydrolysis of said chlorosilanes, heating the resultant product to remove at least most of the hydrogen chloride dissolved therein and thereafter adding sufficient water to complete the hydrolysis of the chlorosilanes.

3. The method of making a polysiloxane resin which comprises dissolving methyltrichlorosilane and dimethyldichlorosilane in a mixture of dioxane and mineral spirits, partially hydrolyzing said chlorosilanes by the addition of water to said solution in an amount ranging from about 50 to about 80 percent of that calculated as necessary for complete hydrolysis of the chlorosilanes, heating the resultant product to a temperature sufficient to remove most of the hydrogen chloride dissolved therein, and thereafter adding additional water to complete the hydrolysis of the chlorosilanes.

4. The method of preparing a polysiloxane resin which comprises partially hydrolyzing a mixture of methylchlorosilanes including methyltrichlorosilane having a methyl-to-silicon ratio of at least one and not more than 1.5 by adding to a solution of said methyl chlorosilanes in a polyether solvent a quantity of water less than that calculated as necessary for complete hydrolysis of the methyl chlorosilanes, heating the resultant product to remove a major portion of the hydrogen chloride dissolved therein and thereafter adding sufficient water thereto to complete the conversion of the chlorosilanes to polysiloxanes.

5. The method of preparing a polysiloxane resin which comprises forming a solution of a mixture of monovalent hydrocarbon-substituted chlorosilanes containing a major portion of methyltrichlorosilane and a minor portion of phenylchlorosilane and having a hydrocarbon-to-silicon ratio of at least one and not more than 1.5 in a polyether solvent, adding to said solution a quantity of water less than that theoretically necessary for complete hydrolysis of said chlorosilanes, heating the resultant product to remove at least most of the hydrogen chloride dissolved therein and thereafter adding sufficient water to complete the hydrolysis of the chlorosilanes.

6. The method of making a polysiloxane resin which comprises dissolving a major portion of methyltrichlorosilane and a minor portion of dimethyldichlorosilane in a mixture of dioxane and mineral spirits to form a solution of chlorosilanes having a monovalent hydrocarbon-to-silicon ratio of at least one and not more than 1.5, partially hydrolyzing said chlorosilanes by the addition of water to said solution in an amount ranging from about 50 to about 80 percent of the water calculated as necessary for complete hydrolysis of the chlorosilanes, heating the resultant product to a temperature sufficient to remove most of the hydrogen chloride dissolved therein, and thereafter adding additional water to complete the hydrolysis of the chlorosilanes.

7. The method of preparing a polysiloxane resin which comprises partially hydrolyzing a mixture of chlorosilanes including a major portion of methyl chlorosilanes and having a monovalent hydrocarbon-to-silicon ratio of at least one and not more than 1.5 by adding to a solution of said chlorosilanes in a polyether solvent a quantity of water ranging from about 50 to about 80 percent of that calculated as necessary for complete hydrolysis of said chlorosilanes, heating the resultant product to remove most of the hydrogen chloride dissolved therein and thereafter adding sufficient water thereto to complete the hydrolysis of the chlorosilanes.

HARRY F. LAMOREAUX.

REFERENCES CITED

The following references are of record in the file of this patent:

UNITED STATES PATENTS

| Number | Name | Date |
|---|---|---|
| 2,258,218 | Rochow | Oct. 7, 1941 |
| 2,258,222 | Rochow | Oct. 7, 1941 |
| 2,371,068 | Rochow | Mar. 6, 1945 |
| 2,375,998 | McGregor et al. | May 15, 1945 |
| 2,381,366 | Patnode | Aug. 7, 1945 |
| 2,383,827 | Sprung | Aug. 28, 1945 |
| 2,389,477 | Wright et al. | Nov. 20, 1945 |
| 2,405,041 | Mathes et al. | July 30, 1946 |
| 2,406,621 | Marsden | Aug. 27, 1946 |
| 2,450,594 | Hyde | Oct. 5, 1948 |